(12) United States Patent
Mizoguchi et al.

(10) Patent No.: US 9,823,553 B2
(45) Date of Patent: Nov. 21, 2017

(54) OPTICAL DEVICE AND IMAGE DISPLAY APPARATUS

(71) Applicant: Seiko Epson Corporation, Tokyo (JP)

(72) Inventors: Yasushi Mizoguchi, Suwa (JP); Shinichi Wakabayashi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/163,829

(22) Filed: May 25, 2016

(65) Prior Publication Data

US 2016/0363840 A1 Dec. 15, 2016

(30) Foreign Application Priority Data

Jun. 9, 2015 (JP) ................................. 2015-116897

(51) Int. Cl.
| | | |
|---|---|---|
| *G03B 21/14* | (2006.01) | |
| *G02B 27/01* | (2006.01) | |
| *G09G 3/00* | (2006.01) | |
| *H04N 9/31* | (2006.01) | |
| *G03B 5/02* | (2006.01) | |

(52) U.S. Cl.
CPC ....... *G03B 21/142* (2013.01); *G02B 27/0101* (2013.01); *G02B 27/0172* (2013.01); *G03B 5/02* (2013.01); *G09G 3/002* (2013.01); *G09G 3/007* (2013.01); *H04N 9/312* (2013.01); *H04N 9/3135* (2013.01); *G02B 2027/0147* (2013.01); *G02B 2027/0154* (2013.01)

(58) Field of Classification Search
CPC ...... G03B 21/005; G03B 21/14; G03B 21/28; G03B 21/145; G03B 2205/0023; G03B 35/04; G02B 26/085; G02B 26/101
See application file for complete search history.

(56) References Cited

U.S. PATENT DOCUMENTS

| | | | |
|---|---|---|---|
| 8,562,148 B2 | 10/2013 | Horiguchi et al. | |
| 8,994,764 B2 | 3/2015 | Watanabe | |
| 9,442,353 B2 | 9/2016 | Kadotani et al. | |
| 2005/0275810 A1 | 12/2005 | Choi et al. | |
| 2007/0285629 A1* | 12/2007 | Yavid ................... | G02B 26/101 353/97 |

(Continued)

FOREIGN PATENT DOCUMENTS

| | | |
|---|---|---|
| JP | 2011-203460 A | 10/2011 |
| JP | 2016-126103 A | 7/2016 |

(Continued)

*Primary Examiner* — Sultan Chowdury
(74) *Attorney, Agent, or Firm* — Harness, Dickey & Pierce, P.L.C.

(57) ABSTRACT

An optical device includes a movable unit that supports a glass plate, axis portions that swingably support the movable unit around a swing axis, a support unit that supports the axis portions and, a permanent magnet that is provided in the movable unit, and a coil that is disposed to face the permanent magnet, and a coil support unit that is supported by the support unit and supports the coil. A conductive wire is wound around the coil and a drawn wire is drawn from the side of the inner circumference of the coil. The coil support unit includes a through hole overlapping the inner circumference of the coil and the drawn wire is inserted through the through hole.

17 Claims, 10 Drawing Sheets

(56) References Cited

U.S. PATENT DOCUMENTS

| | | | | |
|---|---|---|---|---|
| 2011/0141441 A1* | 6/2011 | Konno | ............... | G02B 26/0841 |
| | | | | 353/69 |
| 2012/0062969 A1 | 3/2012 | Watanabe et al. | | |
| 2014/0313557 A1* | 10/2014 | Brown | ................. | G02B 26/105 |
| | | | | 359/200.7 |
| 2015/0293349 A1* | 10/2015 | Matozaki | ............... | G02B 27/01 |
| | | | | 359/198.1 |
| 2016/0187645 A1 | 6/2016 | Mizoguchi et al. | | |

FOREIGN PATENT DOCUMENTS

| | | |
|---|---|---|
| JP | 2016-142863 A | 8/2016 |
| JP | 2016-143989 A | 8/2016 |

\* cited by examiner

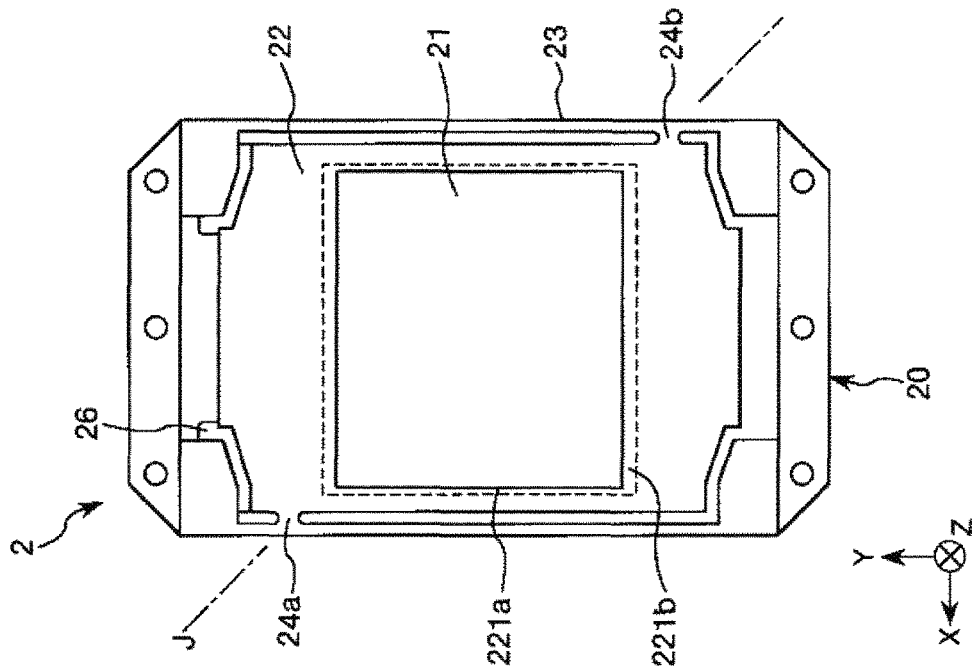
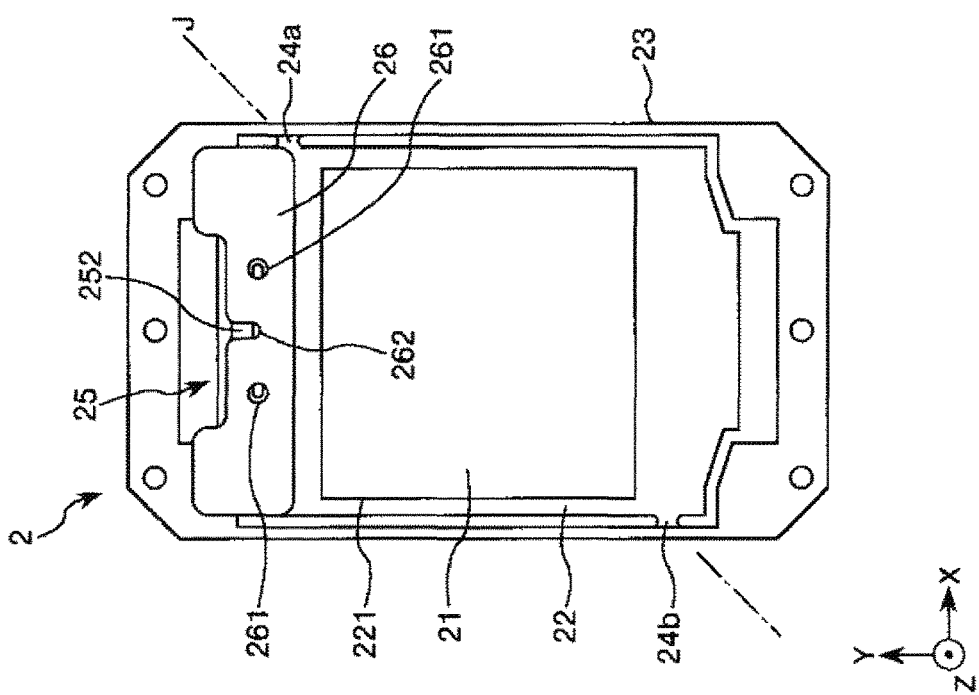

OPTICAL DEVICE AND IMAGE DISPLAY APPARATUS

BACKGROUND

1. Technical Field

The present invention relates to an optical device and an image display apparatus.

2. Related Art

To cause the resolutions of images to be projected to be higher than the resolutions of optical modulation devices such as liquid crystal panels in related art, there are technologies for shifting the axis of video light exited from the light modulation devices, as in JP-A-2011-203460. In JP-A-2011-203460, a wobbling device including an optical transmission plate and a driving unit (piezoelectric element) swaying the optical transmission plate is used as a device shifting the axis of video light.

In the wobbling device of JP-A-2011-203460, the configuration of the driving unit is not clearly disclosed. In the wobbling device, the configuration of the driving unit has a considerable influence on driving precision of the optical transmission plate. Therefore, depending on the configuration of the driving unit of JP-A-2011-203460, there is a concern of the optical transmission plate not swaying with high precision and display characteristics deteriorating.

SUMMARY

An advantage of some aspects of the invention is to provide an optical device with excellent driving precision and an image display apparatus including the optical device.

The invention can be implemented as the following configurations.

An optical device according to an aspect of the invention includes: an optical unit that has a light incident surface on which light is incident; a movable unit that supports the optical unit; an axis portion that swingably supports the movable unit around a swing axis; a support unit that supports the axis portion; a permanent magnet that is provided in the movable unit; a coil that generates a magnetic field to be applied to the permanent magnet; and a coil support unit that is supported by the support unit and supports the coil. A conductive wire is wound around the coil. One end of the conductive wire is drawn from an inner circumference of the conductive wire wound around the coil. The coil support unit includes a through hole formed to overlap an inner circumference of the coil in a plan view in a thickness direction of the optical unit. The conductive wire drawn from the inner circumference of the coil is inserted through the through hole.

With this configuration, the optical device with excellent driving precision is obtained. Specifically, for example, in a case in which the conductive wire drawn from the inner circumference of the conductive wire wound around the coil is drawn to the outside of the coil between the coil support unit and the coil, the coil may be inclined toward the coil support unit and may be inclined toward the permanent magnet due to the thickness of the drawn conductive wire. When the coil is inclined toward the permanent magnet in this way, a gap between the coil and the permanent magnet may be decreased in a certain location. Thus, there is a concern of the coil coming into contact with the permanent magnet. When the gap between the coil and the permanent magnet is increased to avoid such contact, it is difficult to apply the magnetic field generated from the coil to the permanent magnet to that degree, and thus the driving efficiency of the movable unit deteriorates. However, as in the aspect of the invention, by inserting and drawing the conductive wire drawn from the inner circumference of the conductive wire wound around the coil through the through hole, the conductive wire to be drawn is not interposed between the coil and the coil support unit and the inclination of the coil described above does not occur. Accordingly, while preventing the coil from coming into contact with the permanent magnet, it is possible to efficiently drive the movable unit.

In the optical device according to the aspect of the invention, it is preferable that the through hole is provided to overlap a drawn position of the conductive wire drawn from the inner circumference of the coil in the plan view in the thickness direction of the optical unit.

With this configuration, the inclination of the coil does not occur more reliably.

An optical device according to another aspect of the invention includes: an optical unit that has a light incident surface on which light is incident; a movable unit that supports the optical unit; an axis portion that swingably supports the movable unit around a swing axis; a support unit that supports the axis portion; a permanent magnet that is provided in the movable unit; a coil that generates a magnetic field to be applied to the permanent magnet; and a coil support unit that is supported by the support unit and supports the coil. A conductive wire is wound around the coil. One end of the conductive wire is drawn from an inner circumference of the coil. The coil support unit includes a through hole located inside an inner circumference of the coil in a plan view in a thickness direction of the optical unit. The conductive wire drawn from the inner circumference of the conductive wire wound around the coil is inserted through the through hole.

With this configuration, the optical device with excellent driving precision is obtained. Specifically, for example, in a case in which the conductive wire drawn from the inner circumference of the conductive wire wound around the coil is drawn to the outside of the coil between the coil support unit and the coil, the coil may be inclined toward the coil support unit and may be inclined toward the permanent magnet due to the thickness of the drawn conductive wire. When the coil is inclined toward the permanent magnet in this way, a gap between the coil and the permanent magnet may be decreased in a certain location. Thus, there is a concern of the coil coming into contact with the permanent magnet. When the gap between the coil and the permanent magnet is increased to avoid such contact, it is difficult to apply the magnetic field generated from the coil to the permanent magnet to that degree, and thus the driving efficiency of the movable unit deteriorates. However, as in the aspect of the invention, by inserting and drawing the conductive wire drawn from the inner circumference of the conductive wire wound around the coil through the through hole, the conductive wire to be drawn is not interposed between the coil and the coil support unit and the inclination of the coil described above does not occur. Accordingly, while preventing the coil from coming into contact with the permanent magnet, it is possible to efficiently drive the movable unit.

In the optical device according to the aspect of the invention, it is preferable that the through hole is a notch opened to a side surface of the coil support unit.

With this configuration, it is easy to insert the conductive wire drawn from the inner circumference of the conductive wire wound around the coil through the through hole.

An optical device according to still another aspect of the invention includes: an optical unit that has a light incident surface on which light is incident; a movable unit that supports the optical unit; an axis portion that swingably supports the movable unit around a swing axis; a support unit that supports the axis portion; a permanent magnet that is provided in the movable unit; a coil that generates a magnetic field to be applied to the permanent magnet; and a coil support unit that is supported by the support unit and supports the coil. A conductive wire is wound around the coil. One end of the conductive wire is drawn from an inner circumference of the coil. The coil support unit includes a concave portion formed to extend from an inside of the inner circumference of the coil to an outside of an outer circumference of the coil in a plan view in a thickness direction of the optical unit. The conductive wire drawn from the inner circumference of the conductive wire wound around the coil is drawn to the outside of the coil through the concave portion.

With this configuration, the optical device with excellent driving precision is obtained. Specifically, for example, in a case in which the conductive wire drawn from the inner circumference of the conductive wire wound around the coil is drawn to the outside of the coil between the coil support unit and the coil, the coil may be inclined toward the coil support unit and may be inclined toward the permanent magnet due to the thickness of the drawn conductive wire. When the coil is inclined toward the permanent magnet in this way, a gap between the coil and the permanent magnet may be decreased in a certain location. Thus, there is a concern of the coil coming into contact with the permanent magnet. When the gap between the coil and the permanent magnet is increased to avoid such contact, it is difficult to apply the magnetic field generated from the coil to the permanent magnet to that degree, and thus the driving efficiency of the movable unit deteriorates. However, as in the aspect of the invention, by inserting and drawing the conductive wire drawn from the inner circumference of the conductive wire wound around the coil to the outside of the coil through the concave portion, the conductive wire to be drawn is not interposed between the coil and the coil support unit and the inclination of the coil described above does not occur. Accordingly, while preventing the coil from coming into contact with the permanent magnet, it is possible to efficiently drive the movable unit.

In the optical device according to the aspect of the invention, it is preferable that the coil is an air-core coil, the coil and the permanent magnet are disposed to face each other, and a contour of a surface of the permanent magnet facing the coil is located outside a contour of an inner circumference of a surface of the coil facing the permanent magnet in a plan view of the surface of the permanent magnet.

With this configuration, the magnetic field generated from the coil can be applied to the permanent magnet efficiently.

In the optical device according to the aspect of the invention, it is preferable that the coil is an air-core coil, the coil and the permanent magnet are disposed to face each other, and a contour of a surface of the permanent magnet facing the coil is located inside a contour of an outer circumference of a surface of the coil facing the permanent magnet in a plan view of the surface of the permanent magnet.

With this configuration, it is possible to prevent the size of the permanent magnet from increasing.

In the optical device according to the aspect of the invention, it is preferable that the optical unit transmits the light.

With this configuration, the optical axis of the light can be shifted using refraction of the optical unit.

An image display apparatus according to still another aspect of the invention includes the optical device according to the aspect of the invention.

With this configuration, the image display apparatus with excellent display characteristics is obtained.

In the image display apparatus according to the aspect of the invention, it is preferable that the optical unit transmits the light, and a position of a pixel displayed through radiation of the light is shifted when the optical device spatially modulates the light.

With this configuration, it is possible to improve resolution simulatively.

BRIEF DESCRIPTION OF THE DRAWINGS

The invention will be described with reference to the accompanying drawings, wherein like numbers reference like elements.

FIGS. 5A and 5B are a top view and a bottom view illustrating the optical device illustrated in FIG. 4.

DESCRIPTION OF EXEMPLARY EMBODIMENTS

Hereinafter, an optical device and an image display apparatus according to the invention will be described in detail with reference to the appended drawings according to embodiments.

First Embodiment

Figure 1:
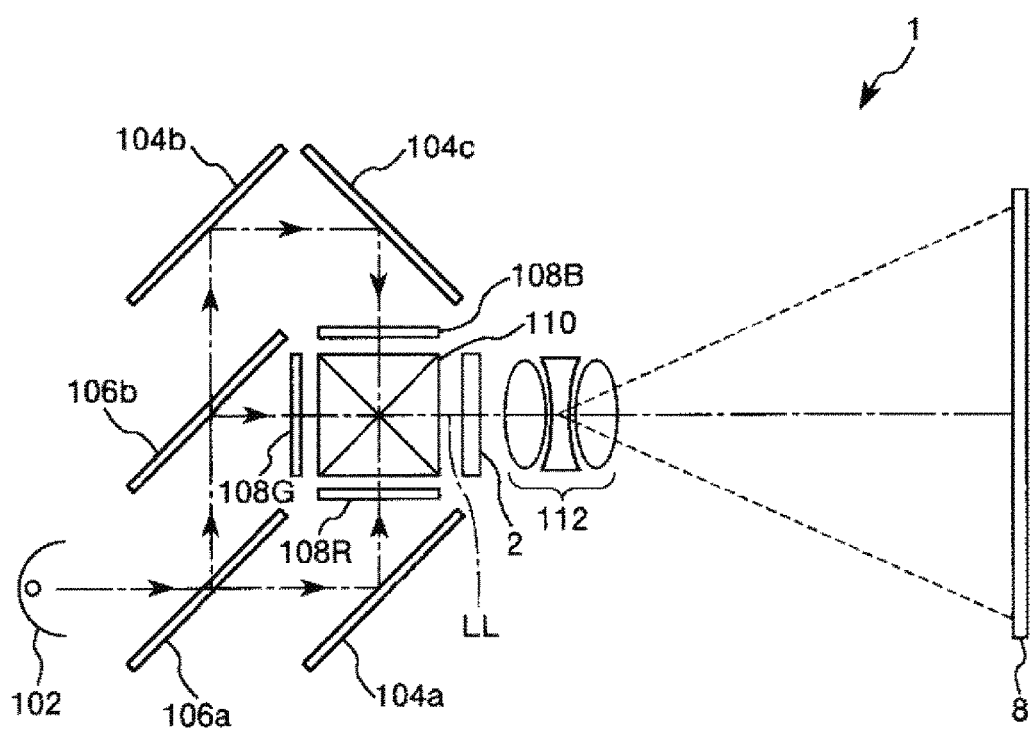
FIG. 1 is a diagram illustrating an optical configuration of an image display apparatus according to a first embodiment of the invention.
Figure 2:
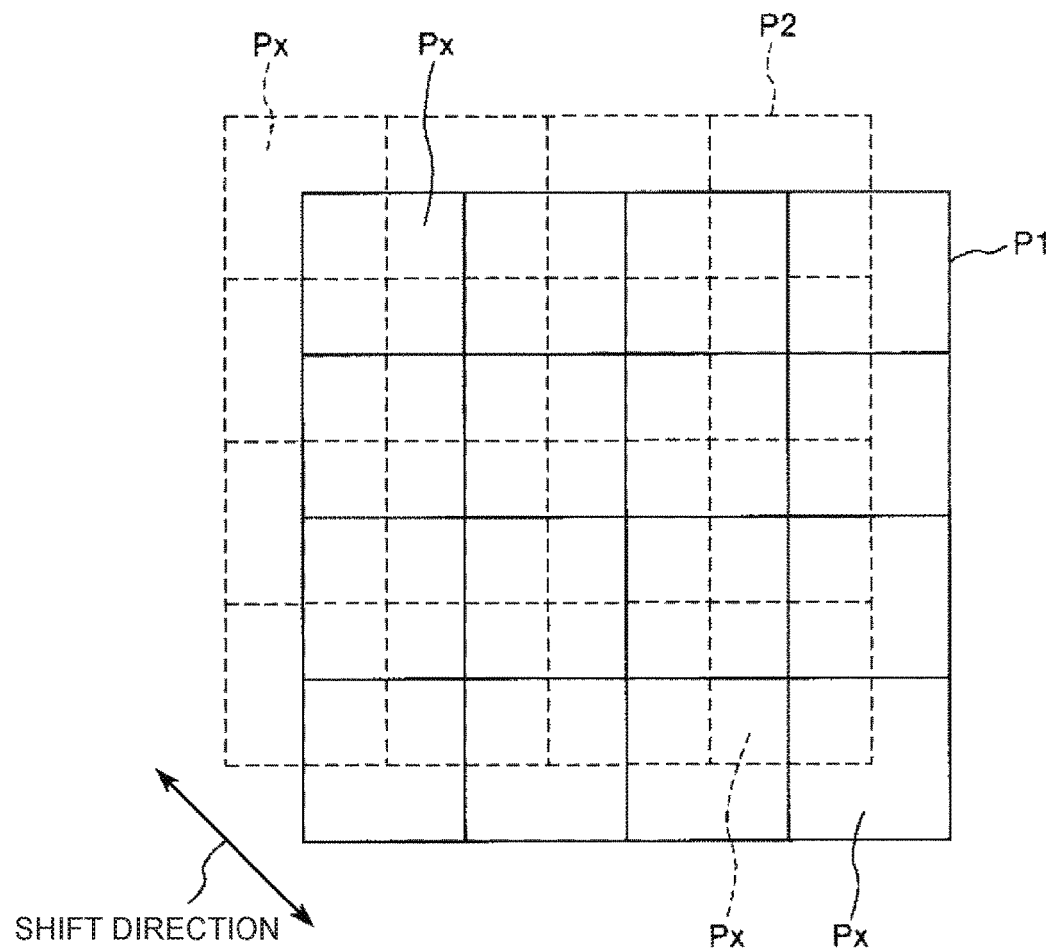
FIG. 2 is a diagram illustrating a shift form of video light.
Figure 3:
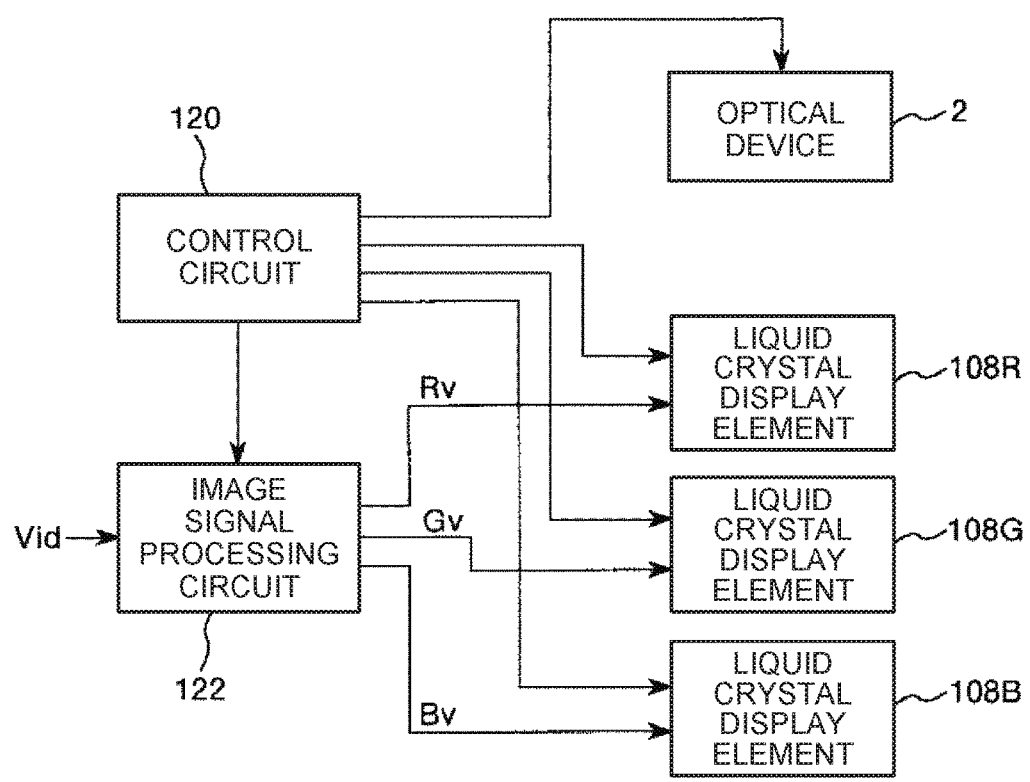
FIG. 3 is a block diagram illustrating an electric configuration of the image display apparatus illustrated in FIG. 1.
Figure 4:
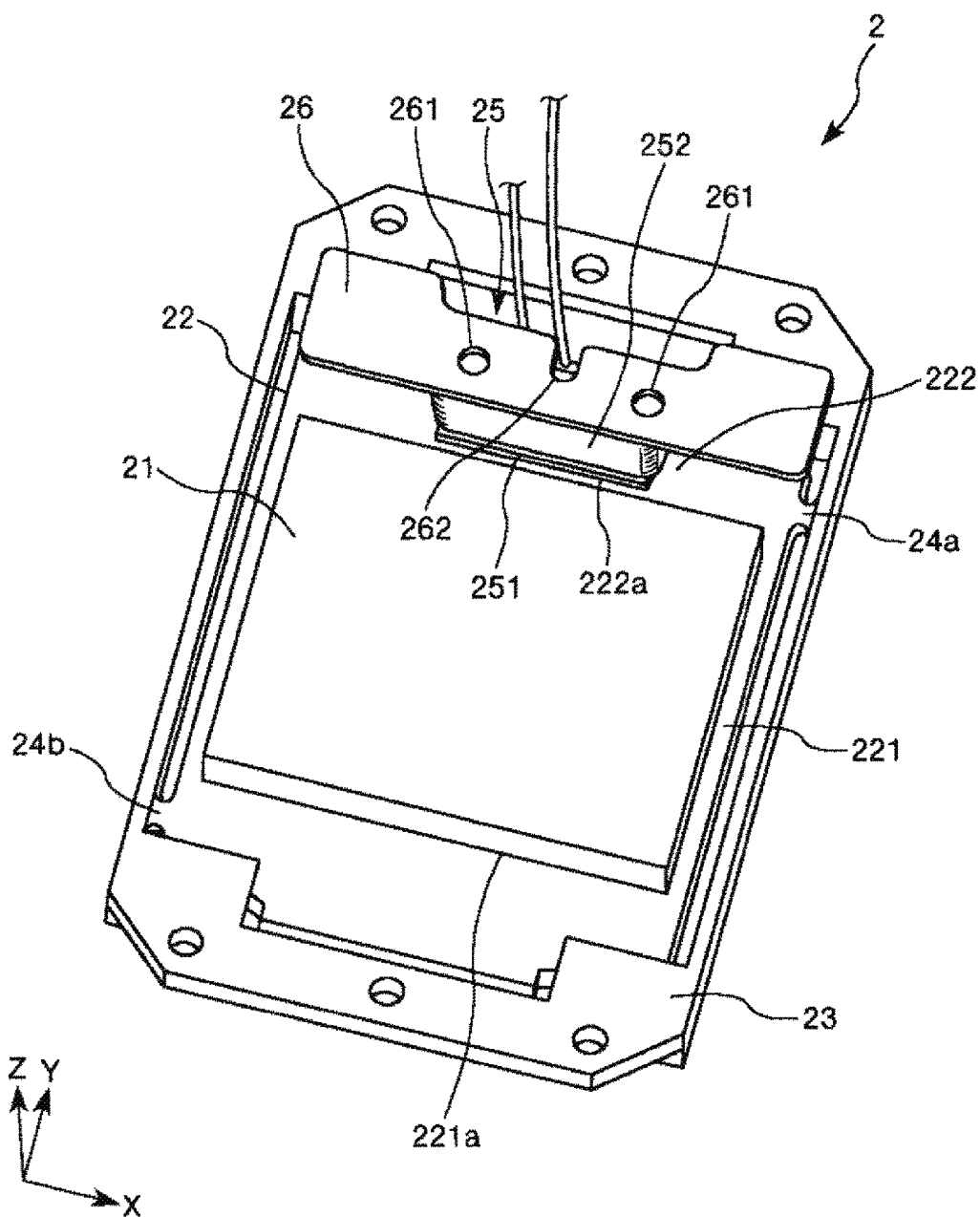
FIG. 4 is a perspective view illustrating an optical device included in the image display apparatus illustrated in FIG. 1.
Figure 6:
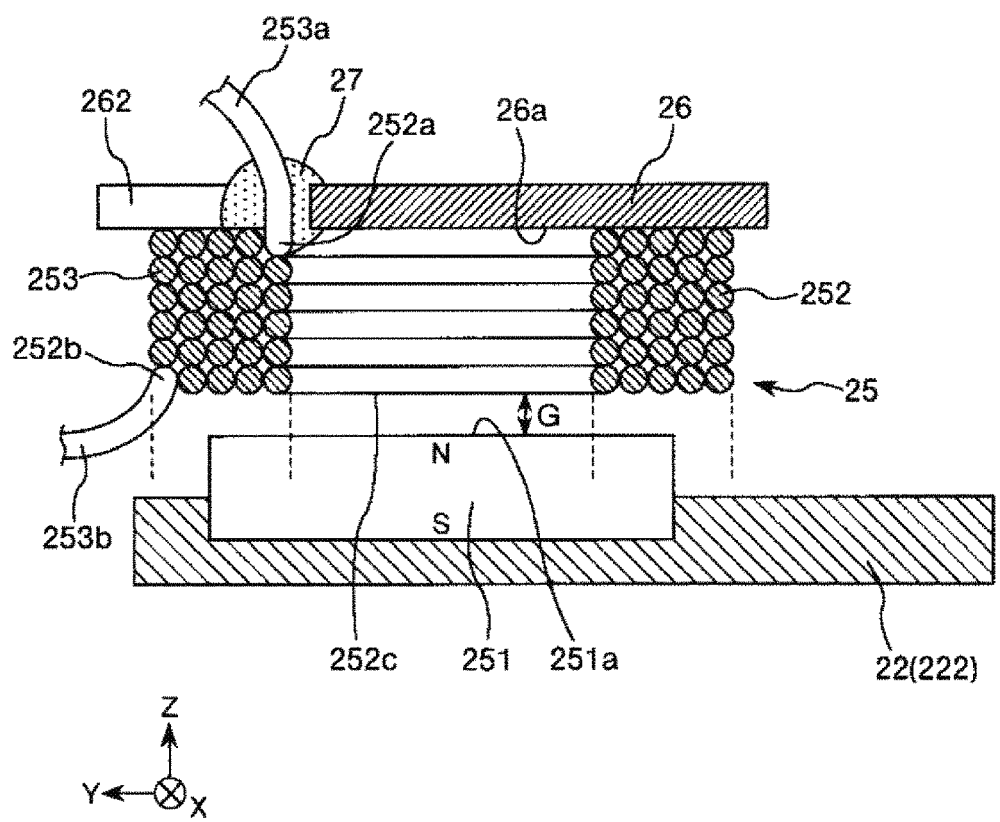
FIG. 6 is a sectional view illustrating a driving mechanism of the optical device illustrated in FIG. 4.
Figure 7:
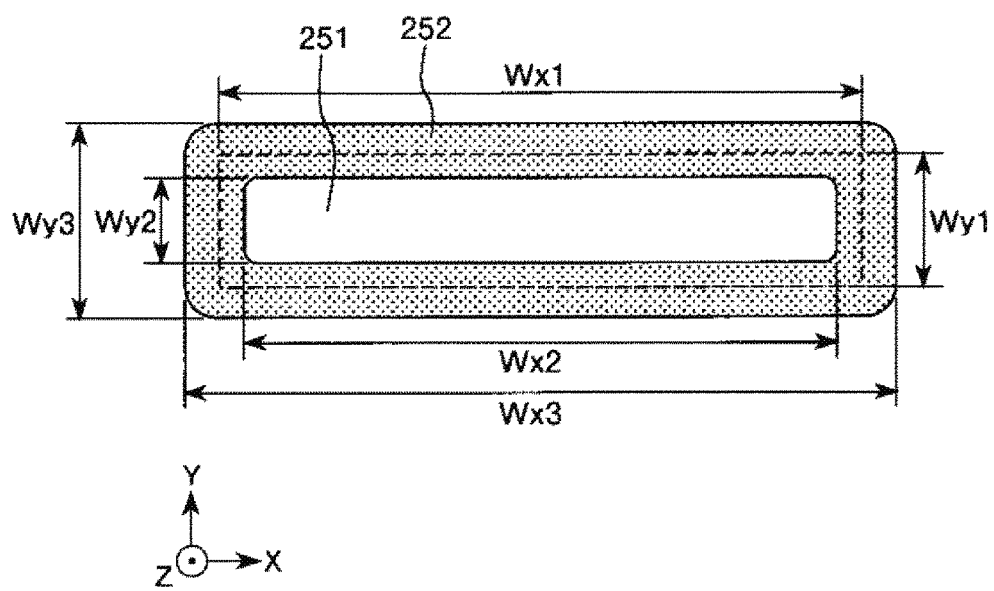
FIG. 7 is a plan view illustrating the driving mechanism illustrated in FIG. 6.
Figure 8:
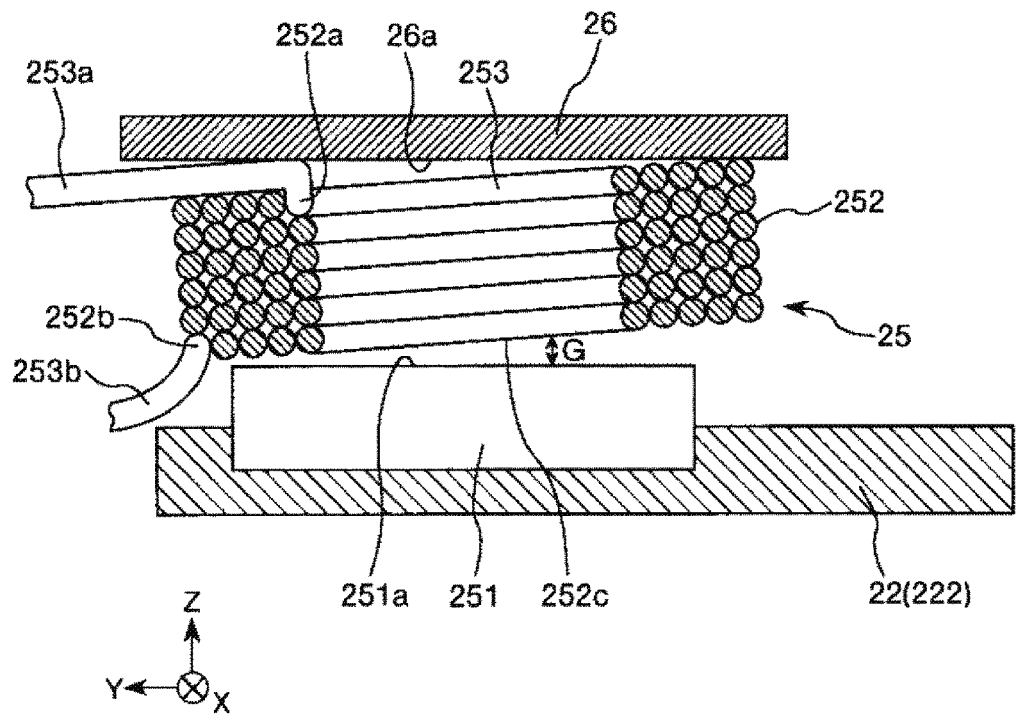
FIG. 8 is a sectional view illustrating the configuration of a driving mechanism of an example of related art.
Figure 9:
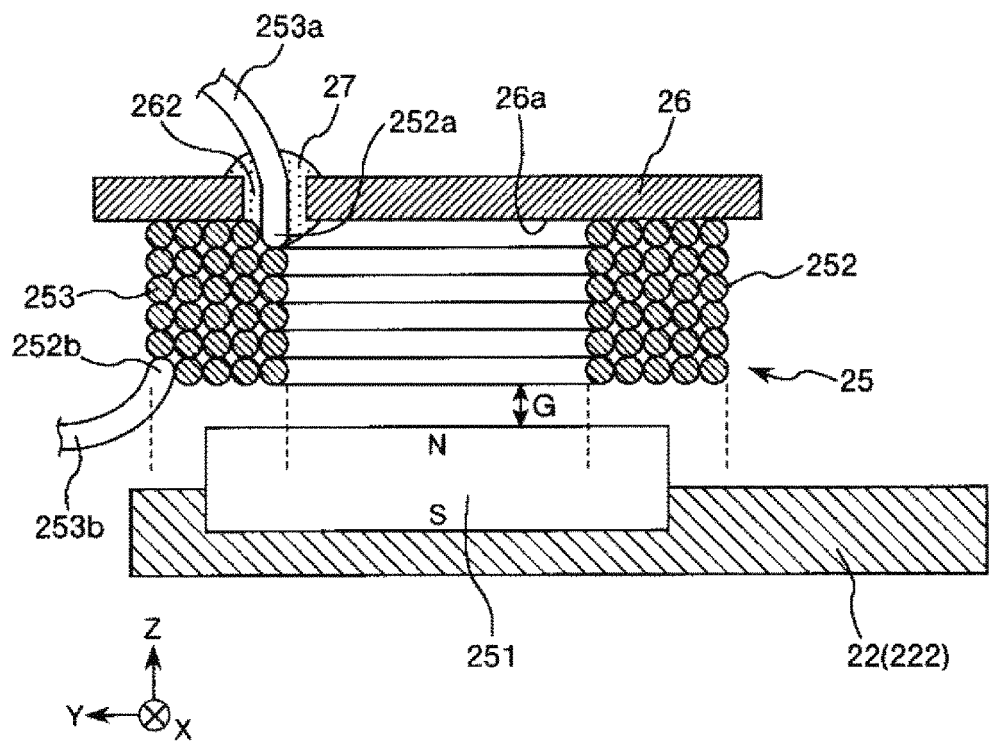
FIG. 9 is a sectional view illustrating a modification example of a coil support unit included in the optical device illustrated in FIG. 4.

FIG. 1 is a diagram illustrating an optical configuration of an image display apparatus according to a first embodiment of the invention. FIG. 2 is a diagram illustrating a shift form of video light. FIG. 3 is a block diagram illustrating an electric configuration of the image display apparatus illustrated in FIG. 1. FIG. 4 is a perspective view illustrating an optical device included in the image display apparatus illustrated in FIG. 1. FIGS. 5A and 5B are a top view and a bottom view illustrating the optical device illustrated in FIG. 4. FIG. 6 is a sectional view illustrating a driving mechanism of the optical device illustrated in FIG. 4. FIG. 7 is a plan view illustrating the driving mechanism illustrated in FIG. 6. FIG. 8 is a sectional view illustrating the configuration of a driving mechanism of an example of related art. FIG. 9 is a sectional view illustrating a modification example of a coil support unit included in the optical device illustrated in FIG. 4. To facilitate the description in FIG. 4 to FIG. 9, X, Y, and Z axes are illustrated as three axes that are orthogonal to each other. Hereinafter, a direction parallel to the X axis is referred to as "X axis direction", a direction parallel to the Y axis is referred to as a "Y axis direction", a direction parallel to the Z axis is referred to as a "Z axis direction", the +Z axis side is referred to as an "upper side", and the −Z axis side is referred to as a "lower side".

Projector

A projector (image display apparatus) 1 illustrated in FIG. 1 is an LCD projector. As illustrated in FIG. 1, the projector 1 includes a light source 102, mirrors 104a, 104b, and 104c, dichroic mirrors 106a and 106b, liquid crystal display elements 108R, 108G, and 108B, a dichroic prism 110, an optical device 2 serving as a light path deflection element, and a projection lens system 112.

Examples of the light source 102 include a halogen lamp, a mercury lamp, and a light-emitting diode (LED). A light source emitting white light is used as the light source 102. The light emitted from the light source 102 is first separated into red light (R) and other light by the dichroic mirror 106a. After the red light is reflected by the mirror 104a, the red light is incident on the liquid crystal display element 108R. The other light is further separated into green light (G) and blue light (B) by the dichroic mirror 106b. The green light is incident on the liquid crystal display element 108G and after the blue light is reflected from the mirrors 104b and 104c, the blue light is incident on the liquid crystal display element 108B.

The liquid crystal display elements 108R, 108G, and 108B are used as spatial light modulators. The liquid crystal display elements 108R, 108G, and 108B are transmission type spatial light modulators corresponding to the primary colors of R, G, and B and have pixels arranged in a matrix form of, for example, 1080 rows and 1920 columns. In each pixel, the amount of transmitted light of incident light is adjusted. A light amount distribution of all the pixels in each of the liquid crystal display elements 108R, 108G, and 108B is controlled cooperatively. The light spatially modulated by the liquid crystal display elements 108R, 108G, and 108B is combined by the dichroic prism 110, and thus full-color video light LL from the dichroic prism 110 is exited. Then, the exited video light LL is enlarged by the projection lens system 112 to be projected to a screen 8.

Here, the projector 1 includes the optical device 2 between the dichroic prism 110 and the projection lens system 112 and is configured to project an image with a resolution (4 K when the liquid crystal display elements 108R, 108G, and 108B have full high-definitions) higher than the resolutions of the liquid crystal display elements 108R, 108G, and 108B to the screen 8 by shifting the light axis of the video light LL by the optical device 2 (performing so-called "pixel shift"). This principle will be described in brief with reference to FIG. 2. As will be described below, the optical device 2 includes a glass plate 21 through which the video light LL is transmitted (see FIG. 4), and thus can shift the light axis of the video light LL using refraction by changing the posture of the glass plate 21.

In the projector 1, using the shift of the light axis, an image display position P1 in a case of shift of the light axis of the video light LL to one side and an image display position P2 in a case of shift of the light axis of the video light LL to the other side are configured to be deviated by half of a pixel (that is, half of a pixel Px) in an inclination direction (an arrow direction in FIG. 2) on the screen 8. When images are alternately displayed at the image display positions P1 and P2, the number of pixels apparently increases. Thus, the high resolution of the image projected to the screen 8 can be achieved. The shift amount of the image display positions P1 and P2 is not limited to half of a pixel. For example, the shift amount may be ¼ or ¾ of the pixel Px.

The projector 1 with such a configuration further includes a control circuit 120 and an image signal processing circuit 122 in addition to the optical device 2 and the liquid crystal display elements 108R, 108G, and 108B, as illustrated in FIG. 3. The control circuit 120 controls, for example, an operation of writing data signals on the liquid crystal display elements 108R, 108G, and 108B, a light path deflection operation of the optical device 2, an operation of generating a data signal in the image signal processing circuit 122. On the other hand, the image signal processing circuit 122 separates an image signal Vid supplied from an external apparatus (not illustrated) into the three primary colors of R, G, and B and converts the image signal into data signals Rv, Gv, and Bv respectively appropriate for operations of the liquid crystal display elements 108R, 108G, and 108B. The converted data signals Rv, Gv, and Bv are supplied to the liquid crystal display elements 108R, 108G, and 108B, respectively, so that the liquid crystal display elements 108R, 108G, and 108B operate based on the data signals Rv, Gv, and Bv.

Optical Device

Next, the optical device 2 embedded in the above-described projector 1 will be described in detail.

As illustrated in FIGS. 4 to 6, the optical device 2 includes a movable unit 22 that includes a glass plate (optical unit) 21 having optical transparency and deflecting the video light LL, a support unit 23 that has a frame shape provided around the movable unit 22, a structure that includes axis portions 24a and 24b connecting the movable unit 22 to the support unit 23 and supporting the movable unit 22 to be swingable (rotatable) about a swing axis J with respect to the support unit 23, a driving mechanism 25, which causes the movable unit 22 to swing with respect to the support unit 23, and a coil support unit 26 that holds coil 252 included in the driving mechanism 25. The optical device 2 with such a configuration is disposed inside the projector 1 so that the −Z side is oriented toward the side of the dichroic prism 110 and the +Z side is oriented toward the side of the projection lens system 112. However, the direction of the optical device 2 may be reversed.

The movable unit 22 has a flat plate shape and includes a glass plate support unit 221 that supports the glass plate 21 and permanent magnet support unit 222 that is provided outside the glass plate support unit 221 and supports permanent magnets 251 included in the driving mechanism 25.

The glass plate support unit 221 includes a through hole 221a in the middle thereof. The glass plate support unit 221 includes a claw portion (stepped portion) 221b protruding inside the through hole 221a on the −Z axis side from the end of the through hole 221a. The glass plate 21 is inserted into the through hole 221a to be caught by the claw portion 221b. Thus, the glass plate 21 is attached to the glass plate support unit 221 by an adhesive or the like.

The glass plate 21 supported by the glass plate support unit 221 has a rectangular shape in a plan view (a shape viewed in the thickness direction). One main surface of the glass plate 21 serves as a light incident surface on which light LL is incident. The glass plate 21 can transmit the incident video light LL to be refracted by inclining an incident angle of the video light LL from 0°. Accordingly, by changing the posture of the glass plate 21 so that a targeting incident angle is obtained, it is possible to control a deflection direction or a deflection amount of the video light LL. The size of the glass plate 21 is appropriately set so that the video light LL exited from the dichroic prism 110 can be transmitted. The glass plate 21 is preferably substantially colorless and transparent. Anti-reflection films may be formed on the incident surface and the exit surface of the glass plate 21 on which and from which the video light LL is incident and exited.

A material of which the glass plate 21 is formed is not particularly limited. For example, any of various glass materials such as white plate glass, borosilicate glass, and quartz glass can be used. In the embodiment, the glass plate 21 is used as an optical unit. The optical unit is not particularly limited as long as the optical unit is formed of a material which has optical transparency and is capable of refracting the video light LL. The optical unit may be formed of not only glass but also, for example, any of various crystalline materials such as crystal quartz and sapphire or any of various resin materials such as polycarbonate-based resin and an acrylic-based resin. However, it is preferable to use the glass plate 21 as the optical unit as in the embodiment. By using the glass plate 21, it is possible to particularly suppress deflection irregularity of the video light LL deflected in the optical unit since the rigidity of the optical unit can be particularly increased.

The permanent magnet support unit 222 is connected to the outer circumference of the glass plate support unit 221 by which the glass plate 21 is supported. A concave portion 222a with a bottom opened to the surface on the +Z axis side is provided in the permanent magnet support unit 222. The permanent magnet 251 is inserted into the concave portion 222a. For example, the permanent magnet 251 is adhered to the concave portion 222a by an adhesive or the like.

The configuration of the movable unit 22 has been described above. The support unit 23 with a frame shape is provided around the movable unit 22 with such a configuration, and the movable unit 22 and the support unit 23 are connected by the axis portions 24a and 24b. The axis portions 24a and 24b are located to be deviated in the X axis direction and the Y axis direction in the plan view and form the swing axis J of the movable unit 22. In the embodiment, the movable unit 22 is swung about the swing axis J inclined at about 45° with respect to both X and Y axes, and thus the posture of the glass plate 21 is changed with the swinging. In particular, in the optical device 2, the axis portions 24a and 24b are disposed to be point-symmetric centering on the glass plate 21 in the plan view. Therefore, swinging balance of the movable unit 22 is good. The inclination angle of the swing axis J with respect to the X axis (the Y axis) is not limited to 45°.

The movable unit 22, the support unit 23, and the axis portions 24a and 24b are integrally configured (integrated). Accordingly, shock resistance or long-term durability can be increased in boundaries of the support unit 23 and the axis portions 24a and 24b or boundaries of the axis portions 24a and 24b and the movable unit 22.

The movable unit 22, the support unit 23, and the axis portions 24a and 24b are formed of a material with the lower Young's modulus than the material of the glass plate 21. As such a material, material containing a resin is preferable and a material having a resin as a main component is more preferable. Accordingly, it is possible to prevent stress occurring with the swinging the movable unit 22 from being connected to unnecessary vibration of the glass plate 21 itself. The flexible movable unit 22 surrounds the side surfaces of the glass plate 21. Therefore, when the posture of the glass plate 21 is changed, stress occurring in the glass plate 21 can be suppressed small, and thus unnecessary vibration occurring in the glass plate 21 with a stress distribution can be suppressed small. As a result, it is possible to prevent an image deflected by the glass plate 21 from being deflected in an unintended direction. Further, it is possible to suppress a change in the swing trajectory of the movable unit 22 to an ambient temperature. For example, the axis portions 24a and 24b and the peripheris of the axis portions 24a and 24b can be sufficiently flexible, and thus the miniature optical device 2 with a low resonance frequency (about 130 kHz to about 170 kHz) can be realized.

The resin is not particularly limited. Example of the resin include polyethylene, polypropylene, silicone, polyacetal, polyamide, polycarbonate, polyphenylene ether, polyethylene telephthalate, polybutylene terephthalate, polyarylate, polysulphone, polyethersulfone, polyphenylenesulfide, polyether ether ketone, polyimide, polyetherimide, and fluororesin. A material containing at least one of these resins is used.

Next, the driving mechanism 25 swinging the movable unit 22 will be described. As illustrated in FIG. 6, the driving mechanism 25 is an electromagnetic actuator that includes the permanent magnet 251 provided in the permanent magnet support unit 222 and the coil 252 which is disposed to face the permanent magnet 251 and generates a magnetic field to be applied to the permanent magnet 251. By using the electromagnetic actuator, a force sufficient to swing the movable unit 22 can be generated with the simple configuration, and thus the movable unit 22 can be swung smoothly.

The permanent magnet 251 is formed in a rectangular shape in the X axis direction and is magnetized in the Z axis direction (the thickness direction of the glass plate 21). The permanent magnet 251 is not particularly limited. For example, a neodymium magnet, a ferrite magnet, a samarium-cobalt magnet, or an alnico magnet can be used.

On the other hand, the coil 252 is disposed to face the permanent magnet 251. The coil 252 is disposed to be separate from the permanent magnet 251. A separate distance (gap G) between the coil 252 and the permanent magnet 251 is not particularly limited, but is different in accordance with the size of the movable unit 22, the magnitude of the magnetic field generated from the coil 252, or the like. For example, the gap G is preferably in the range equal to or greater than 0.1 mm and equal to or less than 0.5 mm and is more preferably in the range equal to or greater than 0.2 mm and equal to or less than 0.4 mm. Accordingly, while preventing the permanent magnet 251 from coming into contact with the coil 252 at the time of swinging of the movable unit 22, it is possible to more efficiently apply the magnetic field generated from the coil 252 to the permanent magnet 251. Therefore, the movable unit 22 can be swung more efficiently and stably.

The coil 252 is an air-core coil. Accordingly, it is possible to swing the movable unit 22 more smoothly. More specifically, for example, in a case in which a coil having a magnetic core inside is used as the coil 252, the permanent magnet 251 is attracted to a magnetic core depending on the intensity of the generated magnetic force. Thus, the swing axis J may be displaced and the movable unit 22 may not be swung smoothly in some cases. To prevent occurrence of such a problem, it is preferable to use the air-core coil as the coil 252 as in the embodiment.

As illustrated in FIG. 7, the coil 252 is formed in a substantially rectangular shape corresponding to the shape of the permanent magnet 251 in the plan view. The contour of a surface 251a of the permanent magnet 251 facing the coil 252 is located between the contour of the inner circumference and the contour of the outer circumference of a surface 252c of the coil 252 facing the permanent magnet 251 in the plan view of the surface 251a. That is, the contour of the surface 251a is located outside the contour of the inner circumference of the surface 252c and is located inside the contour of the outer circumference of the surface 252c. In other words, when Wx1 is assumed to be the width of the permanent magnet 251 in a major axis direction (the X axis direction), Wx2 is assumed to be the width of the inner circumference of the coil 252, and Wx3 is assumed to be the width of the outer circumference of the coil 252, a relation of Wx2<Wx1<Wx3 is satisfied. When Wy1 is assumed to be the width of the permanent magnet 251 in a minor axis (the Y axis direction), Wy2 is assumed to be the width of the inner circumference of the coil 252, and Wy3 is assumed to be the width of the outer circumference of the coil 252, a relation of Wy2<Wy1<Wy3 is satisfied.

By setting the contour of the permanent magnet 251 and the size of the coil 252, as described above, the coil 252 can be miniaturized. Therefore, it is possible to suppress a power loss (heat generation or the like) when a current is applied to the coil 252, and thus it is possible to generate the magnetic field from the coil 252 efficiently in a power saving manner. It is possible to apply the magnetic field generated from the coil 252 to the permanent magnet 251 efficiently.

The coil 252 is formed by winding a conductive wire 253 covered with an insulator around a conductor such as an enameled wire, a formal wire, or a vinyl wire. The diameter of the conductive wire 253 is not particularly limited. For example, the diameter can be set to be equal to or greater than about 0.1 mm and equal to or less than about 0.3 mm. An end portion (drawn position) 252a which is a winding start of the coil 252 is located at the end of the inner circumference of the coil 252 on the +Z axis side and an end portion 252b which is the winding end is located at the end portion of the outer circumference of the coil 252 on the −Z axis side. Further, the conductive wire 253 in an unwound state (a turned state in a different direction from the winding direction) is drawn as drawn wires 253a and 253b from the end portions 252a and 252b. In the case of an air-core coil, the inner circumference of the coil 252 indicates the contour of a region (there is no magnetic core since the coil is an air-core coil) which is formed when the conductive wire 253 is wound and in which a magnetic core is normally disposed. In the case in which the coil 252 has a magnetic core, the inner circumference of the coil 252 is defined at a position (which is the contour of the magnetic core in a plan view of the surface 251a) at which the magnetic core comes into contact with the conductive wire 253. The outer circumference of the coil 252 indicates the contour on the outer side of a region formed when the conductive wire 253 is wound.

In the above-described driving mechanism 25, the magnetic field can be generated from the coil 252 by applying a driving signal (alternating voltage) from a voltage application unit (not illustrated) to the coil 252. The movable unit 22 can be swung (rotated) about the swing axis J with respect to the support unit 23 by applying the generated magnetic field to the permanent magnet 251. The light axis of the video light LL is shifted through the swinging of the movable unit 22 and images are alternately displayed at the image display positions P1 and P2. Accordingly, the number of pixels apparently increases, and thus the high resolution of the image can be achieved.

The coil support unit 26 is supported (fixed) by the support unit 23 and supports the coil 252. A method of supporting the coil support unit 26 by the support unit 23 is not particularly limited. For example, the coil support unit 26 can be supported by a fastening screw. As illustrated in FIG. 5A, the coil support unit 26 includes a positioning through hole 261 that facilitates positioning of the coil 252 to the coil support unit 26 and a drawn-wire through hole 262 through which the drawn wire 253a of the coil 252 passes.

One pair of the positioning through holes 261 are provided to be separate in the X axis direction. In a case in which the coil 252 is disposed at a position appropriate for the coil support unit 26, each through hole 261 is configured to overlap the inner circumference of the coil 252. In other words, when the coil support unit 26 is viewed from an opposite surface to a fixing surface 26a to which the coil 252 is fixed, the inner circumference of the coil 252 can be viewed via each through hole 261 in the case in which the coil 252 is disposed at the position appropriate for the coil support unit 26. By providing the positioning through hole 261, it is possible to simply position the coil 252 to the coil support unit 26.

The positioning through hole 261 may further function as an air-vent through hole to reduce a damper effect when the movable unit 22 is swung. That is, when the movable unit 22 is swung and approach the coil support unit 26, the air between the movable unit 22 and the coil support unit 26 is compressed, and thus the compressed air may deteriorate the swinging of the movable unit 22 to the side of the coil support unit 26. Therefore, by providing the through hole 261 and allowing the air between the movable unit 22 and the coil support unit 26 to escape from the through holes 261, it is possible to reduce the damper effect and swing the movable unit 22 more smoothly.

On the other hand, the drawn-wire through hole 262 is a through hole which is used to extract the drawn wire 253a on one end side of the coil 252 to an opposite surface side from the fixing surface 26a to which the coil 252 of the coil support unit 26 is fixed without being passed between the coil 252 and the fixing surface 26a. As illustrated in FIG. 6, the through hole 262 is disposed to overlap the inner circumference of the coil 252 in a plan view of the coil support unit 26 (a plan view in the thickness direction of the glass plate 21) and to overlap the end portion (drawn position) 252a which is the winding start of the coil 252. The drawn wire 253a extending from the end portion 252a which is the winding start of the coil 252 is inserted through the through hole 262 and the drawn wire 253a is drawn on the opposite surface side to the fixing surface 26a. With such a configuration, the following advantages can be obtained.

For example, as illustrated in FIG. 8, in a case in which the drawn wire 253a drawn from the inner circumference (inner circumference side) of the conductive wire 253 around which the coil 252 is wound is drawn to the outside of the coil 252 between the coil support unit 26 and the coil 252, unlike the embodiment, the coil 252 is inclined toward the coil support unit 26 and inclined toward the permanent magnet 251 due to the thickness (diameter) of the drawn wire 253a. When the coil 252 is inclined toward the permanent magnet 251 in this way, the gap G between the coil 252 and the permanent magnet 251 may be decreased at a certain location and the coil 252 may come into contact with the permanent magnet 251. Thus, there is a concern of the smooth swinging of the movable unit 22 deteriorating. In contrast, when the gap G between the coil 252 and the permanent magnet 251 is increased to avoid such contact, it is difficult to apply the magnetic field generated from the coil 252 to the permanent magnet 251 to that degree (an electromagnetic force applied to the permanent magnet 251 deteriorates), and thus the driving efficiency of the driving unit 22 deteriorates.

However, by inserting the drawn wire 253a through the through hole 262, as in the embodiment, the drawn wire 253a can be drawn outside the coil 252 without passing the drawn wire 253a between the coil support unit 26 and the coil 252, unlike the above-described example. Therefore, the coil 252 (the surface 252c of the coil 252 on the side of the permanent magnet 251) and the permanent magnet 251 (the surface 251a of the permanent magnet 251 on the side of the coil 252) can be disposed to be substantially parallel to each other without occurrence of the inclination of the above-described coil 252 (see FIG. 6). Accordingly, it is possible to decrease the gap G while preventing the coil 252 from coming into contact with the permanent magnet 251. Thus it is possible to efficiently drive the movable unit 22.

In particular, in the embodiment, the through hole 262 is configured as a notch opened to the side surface of the coil support unit 26. Therefore, since the drawn wire 253a can be disposed inside the through hole 262 through the opening opened to the side surface of the coil support unit 26, the drawn wire 253a can be inserted through the through hole 262 more easily. The shape of the through hole 262 is not limited to the notched state as in the embodiment, as long as the drawn wire 253a can be passed. For example, as illustrated in FIG. 9, the through hole 262 may not be opened to the side surface of the coil support unit 26.

In the embodiment, the through hole 262 is filled with a fixing member 27. Thus, the drawn wire 253a is fixed to the coil support unit 26 by the fixing member 27. In this way, by fixing the drawn wire 253a to the coil support unit 26, unintended bending or the like of the drawn wire 253a can be suppressed. The fixing member 27 is not particularly limited. A relatively soft member may be used. For example, any of various adhesives such as a silicone-based adhesive, an epoxy-based adhesive, and an acrylic-based adhesive is preferably used. The fixing member 27 may be omitted. By omitting the fixing member 27, the above-described through hole 262 can function as a through hole for an air hole reducing the damper effect, as in the same way as the through hole 261.

As described above, in the embodiment, the contour of the surface 251a of the permanent magnet 251 facing the coil 252 is located inside the contour of the outer circumference of the surface 252c of the coil 252 facing the permanent magnet 251. Therefore, as illustrated in FIG. 6, the end portion 252b which is the winding end of the coil 252 located on the outer circumference of the coil 252 is located outside the permanent magnet 251 in the plan view when viewed in the Z axis direction. Accordingly, the drawn wire 253b extending from the end portion 252b which is the winding end can be drawn outside the coil 252 without contact of the permanent magnet 251.

Second Embodiment

Figure 10:
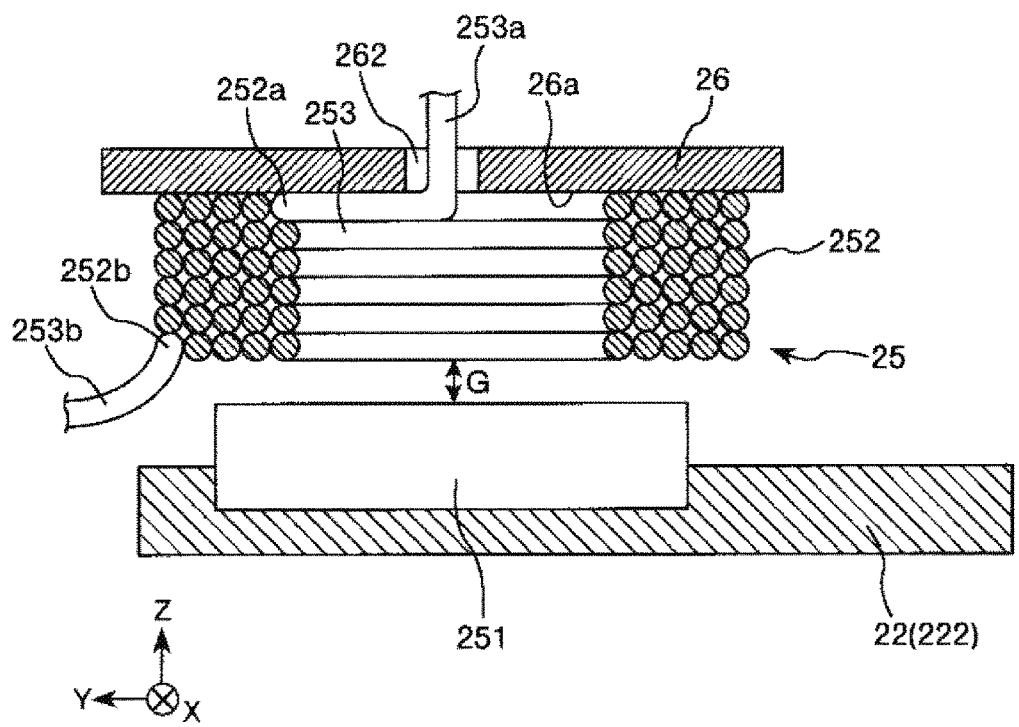
FIG. 10 is a sectional view illustrating an optical device included in an image display apparatus according to a second embodiment of the invention.

FIG. 10 is a sectional view illustrating an optical device included in an image display apparatus according to a second embodiment of the invention.

Hereinafter, the image display apparatus according to the second embodiment of the invention will be described. Differences from the above-described embodiment will be mainly described and the same points will not be described.

The image display apparatus according to the second embodiment is the same as that of the above-described first embodiment except that the configuration of an optical device is different. The same reference numerals are given to the same configurations as those of the above-described embodiment.

In the coil support unit 26 included in the optical device 2 according to the embodiment, as illustrated in FIG. 10, the through hole 262 is provided inside the inner circumference of the coil 252 without overlapping the inner circumference of the coil 252. Even in such a configuration, the gap G can be decreased while preventing the coil 252 from coming into contact with the permanent magnet 251 without occurring of the inclination of the coil 252. Thus it is possible to efficiently drive the movable unit 22.

Even in the second embodiment, the same advantages as those of the above-described first embodiment can be obtained.

Third Embodiment

Figure 11:
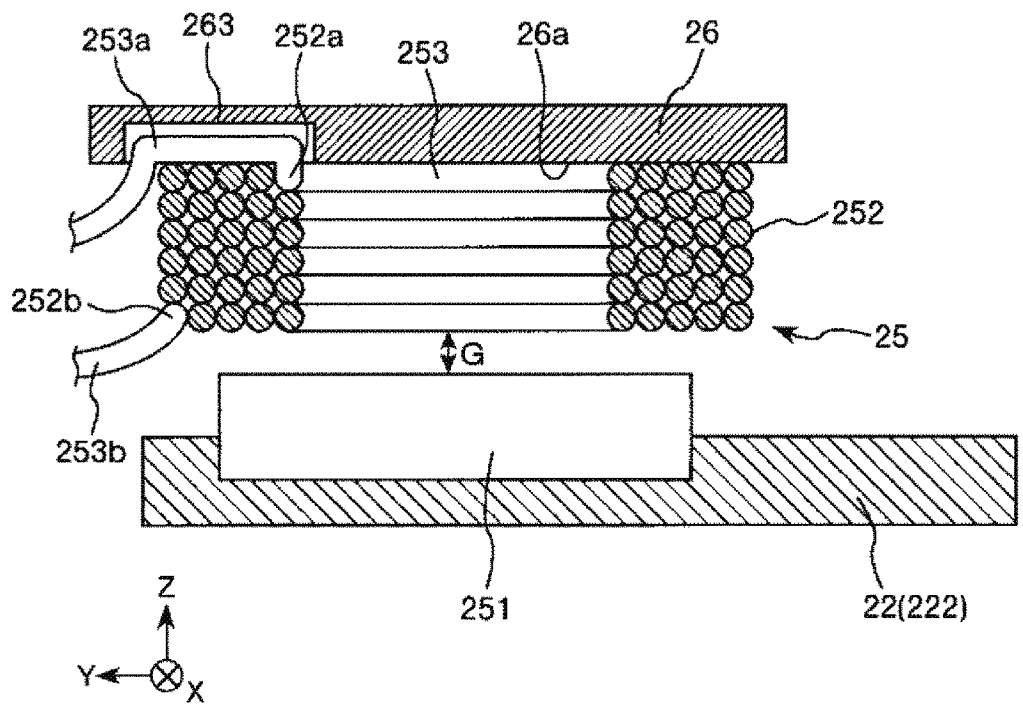
FIG. 11 is a sectional view illustrating an optical device of an image display apparatus according to a third embodiment of the invention.

FIG. 11 is a sectional view illustrating an optical device included in an image display apparatus according to a third embodiment of the invention.

Hereinafter, the image display apparatus according to the third embodiment of the invention will be described. Differences from the above-described embodiment will be mainly described and the same points will not be described.

The image display apparatus according to the third embodiment is the same as that of the above-described first embodiment except that the configuration of an optical device is different. The same reference numerals are given to the same configurations as those of the above-described embodiment.

The coil support unit 26 included in the optical device 2 according to the embodiment includes a concave portion 263 in substitution for the through hole 262 according to the above-described first embodiment, as illustrated in FIG. 11. The concave portion 263 is a concave portion that is used to draw the drawn wire 253a of the coil 252 to the outside of the coil 252 between the coil support unit 26 and the coil 252. The concave portion 263 extends from the inside of the inner circumference of the coil 252 to the outside of the outer circumference of the coil in the plan view of the coil support unit 26 and is provided to overlap the end portion 252a. The width and depth of the concave portion 263 are each greater than the diameter of the conductive wire 253. As illustrated in FIG. 11, the drawn wire 253a drawn from the inner circumference of the coil 252 is drawn outside the coil 252 through the inside of the concave portion 263.

With such a configuration, the inclination of the coil 252 (see FIG. 8) described in the above-described first embodiment does not occur. Accordingly, the gap G can be decreased while preventing the coil 252 from coming into contact with the permanent magnet 251. Thus it is possible to efficiently drive the movable unit 22.

In the embodiment, the concave portion 263 is provided to overlap the end portion 252a of the coil 252, but the concave portion 263 may not overlap the end portion 252a of the coil. In the embodiment, one end portion of the concave portion 263 extends inside the inner circumference of the coil 252. However, for example, the concave portion 263 may not extend inside the inner circumference of the coil 252 as long as the concave portion 263 overlaps the end portion 252a and the drawn wire 253a can be inserted into the concave portion 263.

Even in the third embodiment, the same advantages as those of the above-described first embodiment can be obtained.

Fourth Embodiment

Figure 12:
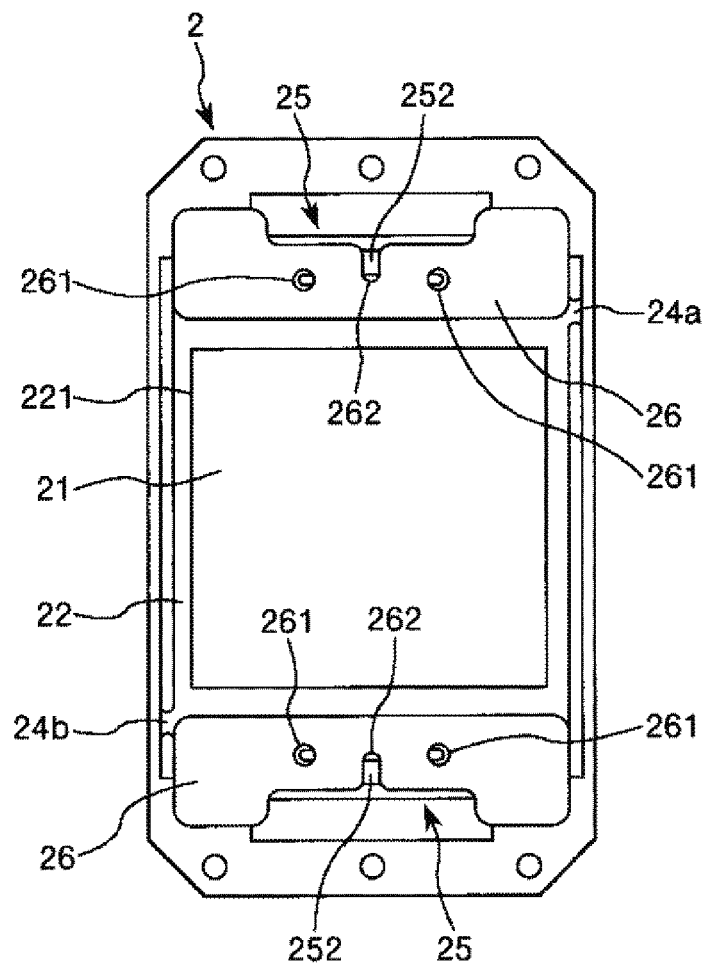
FIG. 12 is a plan view illustrating an optical device of an image display apparatus according to a fourth embodiment of the invention.

FIG. 12 is a plan view illustrating an optical device included in an image display apparatus according to a fourth embodiment of the invention.

Hereinafter, the image display apparatus according to the fourth embodiment of the invention will be described. Differences from the above-described embodiment will be mainly described and the same points will not be described.

The image display apparatus according to the fourth embodiment is the same as that of the above-described first embodiment except that the configuration of an optical device is different. The same reference numerals are given to the same configurations as those of the above-described embodiment.

In the optical device 2 according to the embodiment, as illustrated in FIG. 12, one pair of driving mechanisms 25 are provided via the swing axis J. In this way, by providing one pair of the driving mechanisms 25, the movable unit 22 can be swung more smoothly.

Even in the fourth embodiment, the same advantages as those of the above-described first embodiment can be obtained.

Fifth Embodiment

Figure 13:
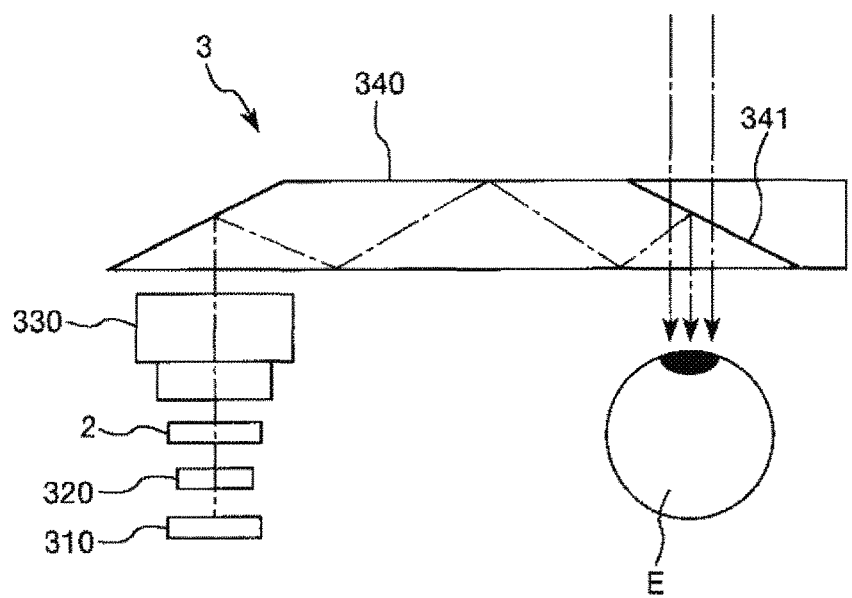
FIG. 13 is a diagram illustrating an optical configuration of an image display apparatus according to a fifth embodiment of the invention.

FIG. 13 is a diagram illustrating an optical configuration of an image display apparatus according to a fifth embodiment of the invention.

Hereinafter, the image display apparatus according to the fifth embodiment will be described. Differences from the above-described embodiment will be mainly described and the same points will not be described.

The image display apparatus according to the fifth embodiment is a semi-transmission type (see-through type) head-mounted display (hereinafter also referred to as an "HMD").

An HMD (image display apparatus) 3 according to the embodiment is mounted on an observer (user) for use. As illustrated in FIG. 13, the HMD 3 includes a light source 310, a liquid crystal display element 320, a projection lens system 330, a light-guiding unit 340, and the optical device 2 serving as a light path deflection element. The light source 310 is not particularly limited. For example, a backlight of an LED can be used. Light generated from the light source 310 is guided to the liquid crystal display element 320. The liquid crystal display element 320 is a transmission type liquid crystal display element. For example, a high-temperature poly silicon (HTPS) single plate TFT color liquid crystal panel can be used. The liquid crystal display element 320 modulates light from the light source 310 to generate video light. The generated video light is enlarged by the projection lens system, and then is incident on the light-guiding unit 340. The light-guiding unit 340 is formed in a plate shape and a half mirror 341 is disposed on a downstream side in a propagation direction of the light. The light guided inside the light-guiding unit 340 travels in a repeatedly reflected manner to be guided to a pupil E of the observer by the half mirror 341. Together with this light, outside light is transmitted through the half mirror 341 to be guided to the pupil E of the observer. Accordingly, in the HMD 3, the video light is superimposed on a landscape to be viewed.

In the HMD 3 with such a configuration, the optical device 2 is disposed between the liquid crystal display element 320 and the projection lens system 330. Accordingly, the light axis of the video light LL can be shifted.

Even in the above-described fifth embodiment, the same advantages as those of the above-described first embodiment can be obtained.

Sixth Embodiment

Figure 14:
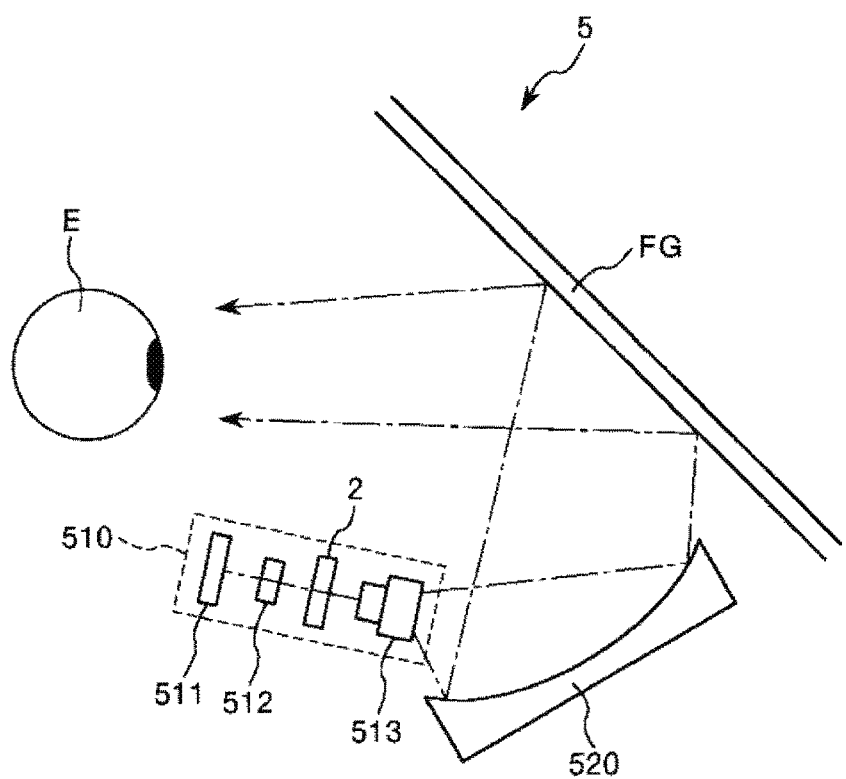
FIG. 14 is a diagram illustrating an optical configuration of an image display apparatus according to a sixth embodiment of the invention.

FIG. 14 is a diagram illustrating an optical configuration of an image display apparatus according to a sixth embodiment of the invention.

Hereinafter, the image display apparatus according to the sixth embodiment of the invention will be described. Differences from the above-described embodiment will be mainly described and the same points will not be described.

The image display apparatus according to the sixth embodiment is a head-up display (hereinafter simply referred to as an "HUD").

An HUD (image display apparatus) 5 according to the embodiment is mounted on, for example, an automobile and is used to project various kinds of information (videos) regarding a speed per hour, a time, a traveling distance, and the like to a driver via a front glass FG. As illustrated in FIG. 14, the HUD 5 includes a projection unit 510 including a light source 511, a liquid crystal display element 512, and a projection lens system 513, a reflection mirror 520, and the optical device 2 serving as a light path deflection element. For example, the light source 511, the liquid crystal display element 512, and the projection lens system 513 can have the same configurations as the light source 310, the liquid crystal display element 320, and the projection lens system 330 according to the above-described third embodiment. The reflection mirror 520 is a concave mirror and reflects projected light from the projection unit 510 to project (display) the light to the front glass FG.

In the HUD 5 with such a configuration, the optical device 2 is disposed between the liquid crystal display element 512 and the projection lens system 513. Accordingly, the light axis of the projected light can be shifted.

Even in the above-described sixth embodiment, the same advantages as those of the above-described first embodiment can be obtained.

The optical device and the image display apparatus according to the invention have been described above according to the illustrated embodiments, but the invention is not limited thereto. For example, the configuration of each unit in the optical device and the image display apparatus according to the invention can be substituted with any configuration with the same function and any different configuration can be added.

In the above-described embodiments, the liquid crystal projector and the light scanning type projector have been described as the image display apparatus, but the image display apparatus is not limited to the projector. The image display apparatus can also be applied to a printer, a scanner, and the like.

The entire disclosure of Japanese Patent Application No. 2015-116897, filed Jun. 9, 2015 is expressly incorporated by reference herein.

What is claimed is:

1. An optical device comprising:
an optical unit that has a light incident surface on which light is incident;
a movable unit that supports the optical unit;
an axis portion that swingably supports the movable unit around a swing axis;
a support unit that supports the axis portion;
a permanent magnet that is provided in the movable unit;
a coil that generates a magnetic field to be applied to the permanent magnet; and
a coil support unit that is supported by the support unit and supports the coil,
wherein a conductive wire is wound around the coil,
wherein one end of the conductive wire is drawn from an inner circumference of the coil,
wherein the coil support unit includes a through hole formed to overlap the inner circumference of the coil in a plan view in a thickness direction of the optical unit, and
wherein the conductive wire drawn from the inner circumference of the coil is inserted through the through hole.

2. The optical device according to claim 1,
wherein the through hole is provided to overlap a drawn position of the conductive wire drawn from the inner circumference of the coil in the plan view in the thickness direction of the optical unit.

3. An optical device comprising:
an optical unit that has a light incident surface on which light is incident;
a movable unit that supports the optical unit;
an axis portion that swingably supports the movable unit around a swing axis;
a support unit that supports the axis portion;
a permanent magnet that is provided in the movable unit;
a coil that generates a magnetic field to be applied to the permanent magnet; and
a coil support unit that is supported by the support unit and supports the coil,
wherein a conductive wire is wound around the coil,
wherein one end of the conductive wire is drawn from an inner circumference of the coil,
wherein the coil support unit includes a through hole located inside the inner circumference of the coil in a plan view in a thickness direction of the optical unit, and
wherein the conductive wire drawn from the inner circumference of the coil is inserted through the through hole.

4. The optical device according to claim 1,
wherein the through hole is a notch opened to a side surface of the coil support unit.

5. An optical device comprising:
an optical unit that has a light incident surface on which light is incident;
a movable unit that supports the optical unit;
an axis portion that swingably supports the movable unit around a swing axis;
a support unit that supports the axis portion;
a permanent magnet that is provided in the movable unit;
a coil that generates a magnetic field to be applied to the permanent magnet; and
a coil support unit that is supported by the support unit and supports the coil,
wherein a conductive wire is wound around the coil,
wherein one end of the conductive wire is drawn from an inner circumference of the conductive wire wound around the coil,
wherein the coil support unit includes a concave portion formed to extend from an inside of an inner circumference of the coil to an outside of an outer circumference of the coil in a plan view in a thickness direction of the optical unit, and
wherein the conductive wire drawn from the inner circumference of the coil is drawn to the outside of the coil through the concave portion.

6. The optical device according to claim 1,
wherein the coil is an air-core coil,
wherein the coil and the permanent magnet are disposed to face each other, and
wherein a contour of a surface of the permanent magnet facing the coil is located outside a contour of an inner circumference of a surface of the coil facing the permanent magnet in a plan view of the surface of the permanent magnet.

7. The optical device according to claim 1,
wherein the coil is an air-core coil,
wherein the coil and the permanent magnet are disposed to face each other, and
wherein a contour of a surface of the permanent magnet facing the coil is located inside a contour of an outer circumference of a surface of the coil facing the permanent magnet in a plan view of the surface of the permanent magnet.

8. The optical device according to claim 1,
wherein the optical unit transmits the light.

9. An image display apparatus comprising:
the optical device according to claim 1.

10. An image display apparatus comprising:
the optical device according to claim 2.

11. An image display apparatus comprising:
the optical device according to claim 3.

12. An image display apparatus comprising:
the optical device according to claim 4.

13. An image display apparatus comprising:
the optical device according to claim 5.

14. An image display apparatus comprising:
the optical device according to claim 6.

15. An image display apparatus comprising:
the optical device according to claim 7.

16. An image display apparatus comprising:
the optical device according to claim 8.

17. The image display apparatus according to claim 9,
wherein the optical unit transmits the light, and
wherein a position of a pixel displayed through radiation of the light is shifted when the optical device spatially modulates the light.

* * * * *